June 17, 1958     E. K. BENEDEK     2,839,007
ROTARY FLUID PRESSURE DEVICE
Filed April 16, 1952     9 Sheets-Sheet 4
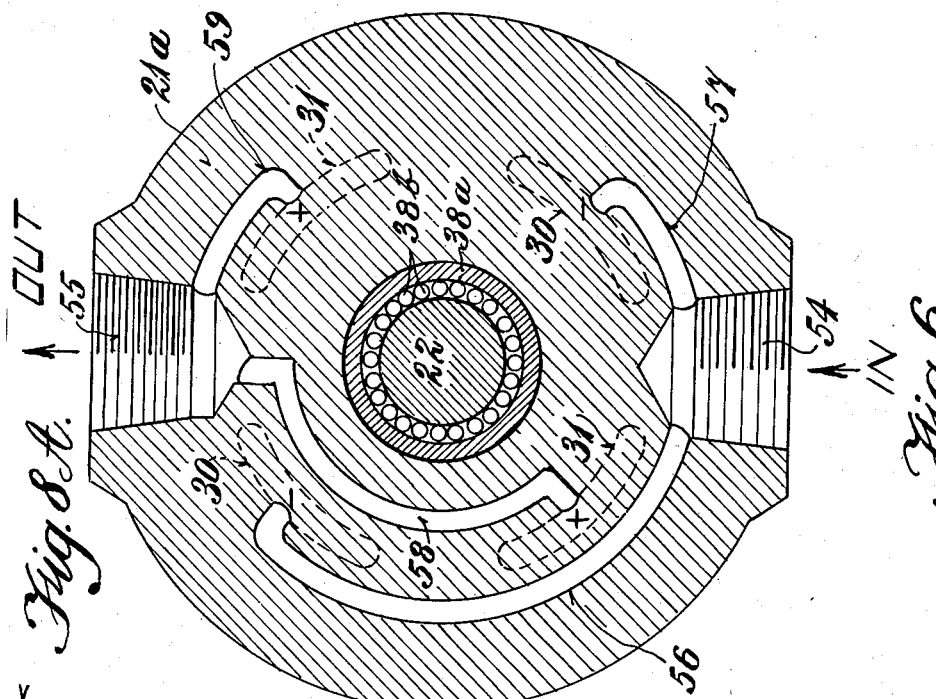
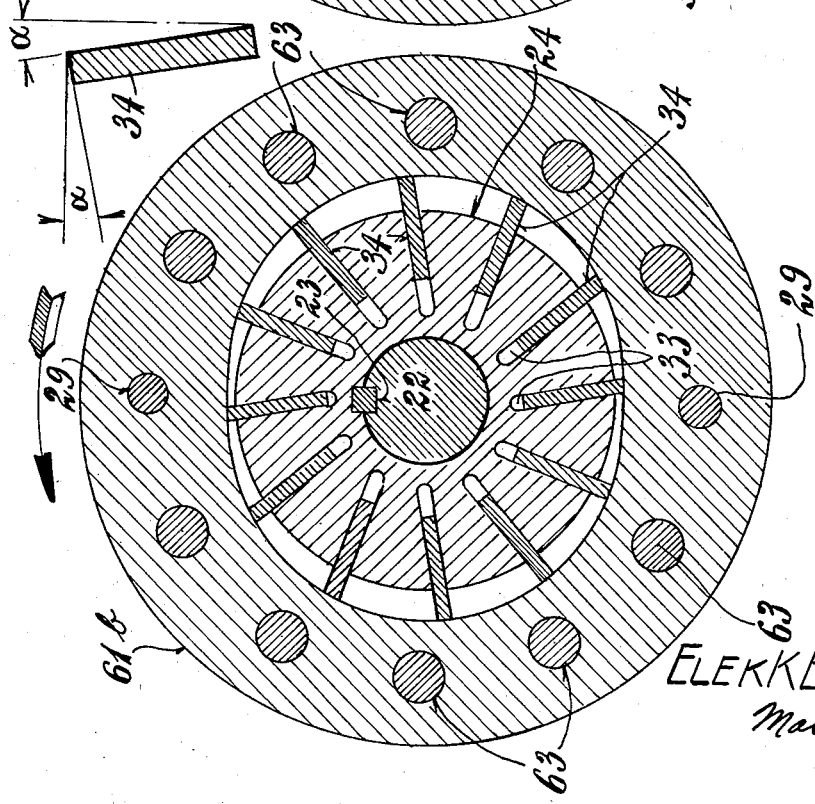
Inventor.
ELEKK BENEDEK
Mason + Hyss
Attorneys June 17, 1958  E. K. BENEDEK  2,839,007
ROTARY FLUID PRESSURE DEVICE
Filed April 16, 1952  9 Sheets-Sheet 5
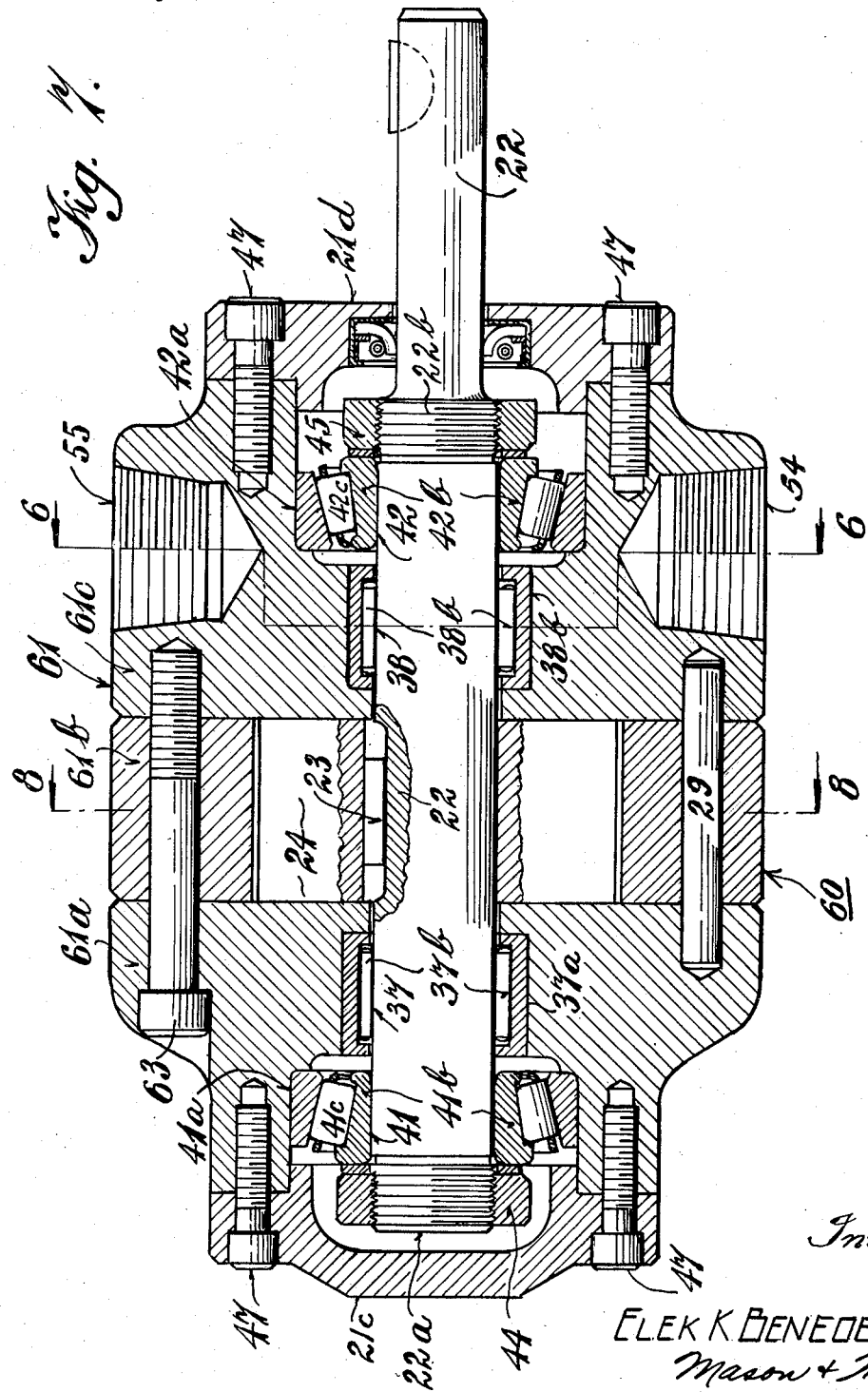
Inventor
ELEK K BENEDEK
Mason + Nyss
Attorneys

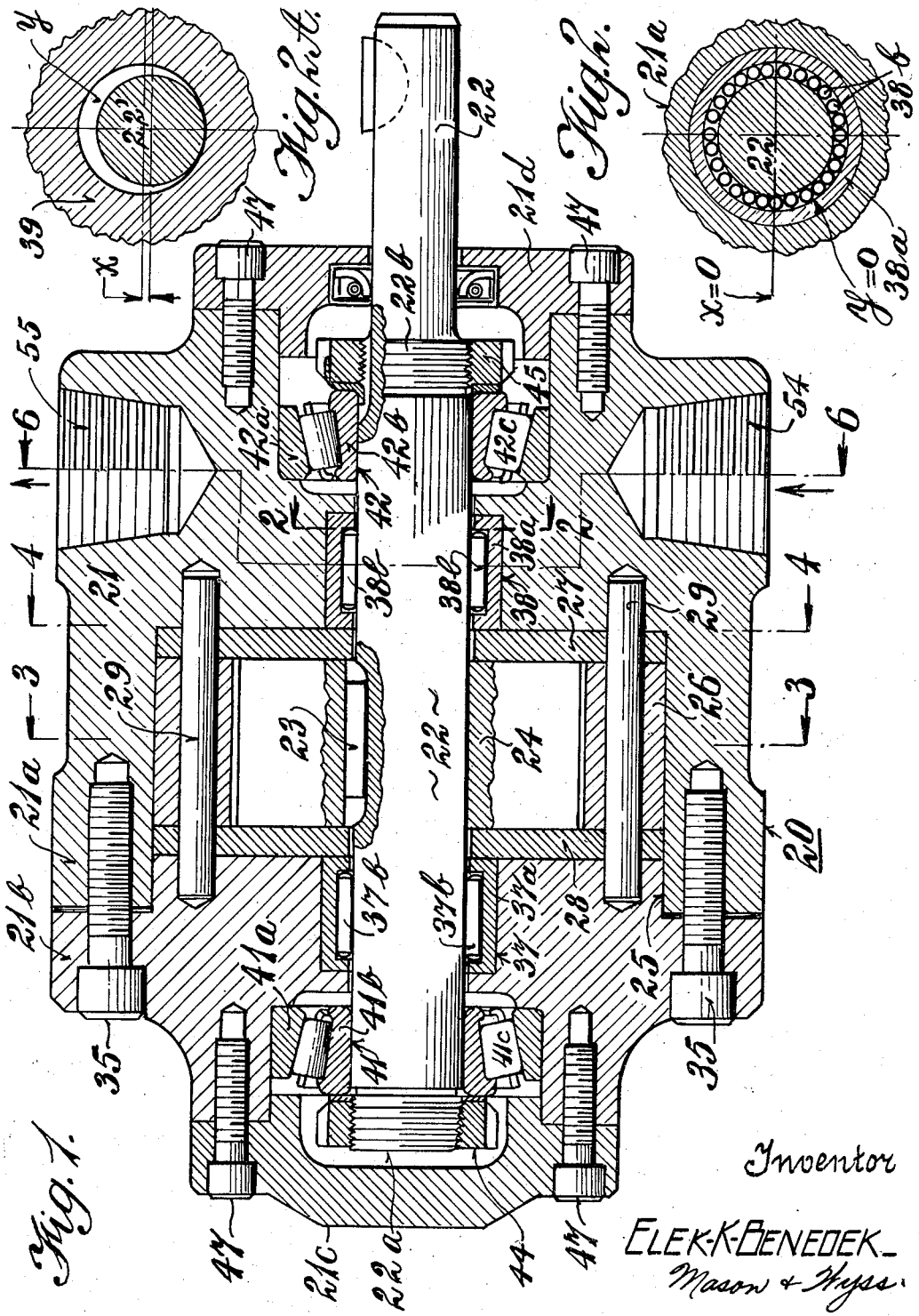

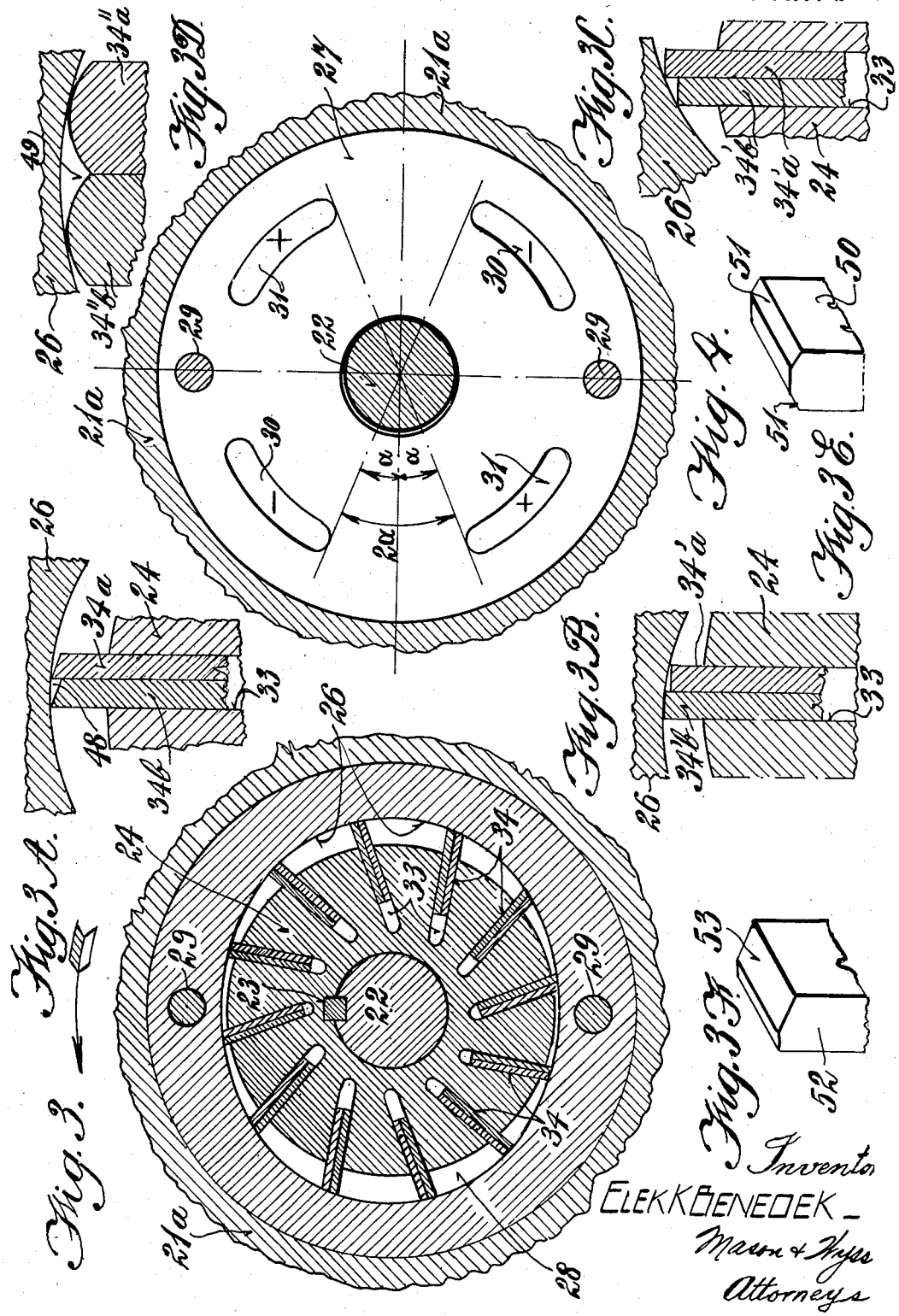

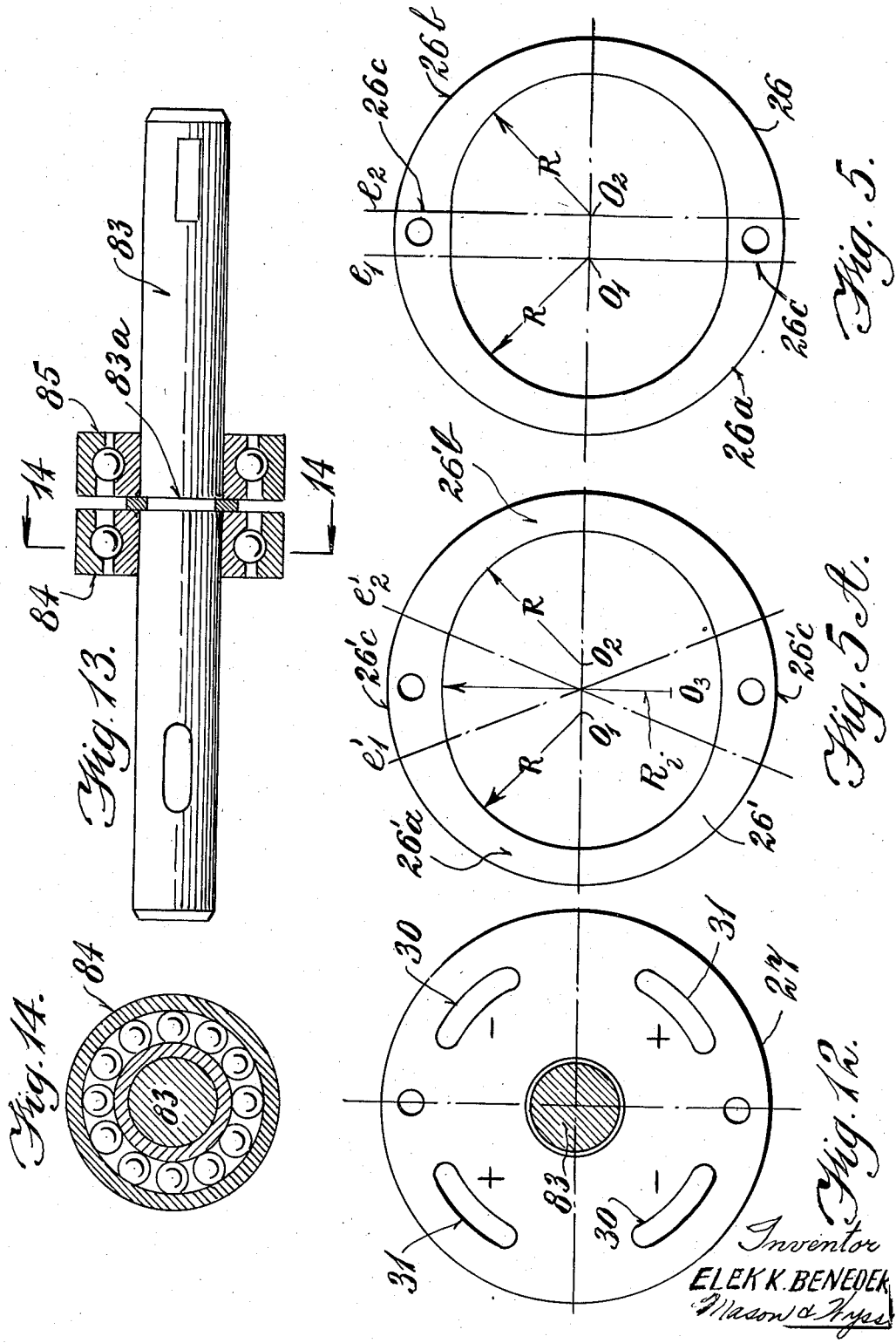

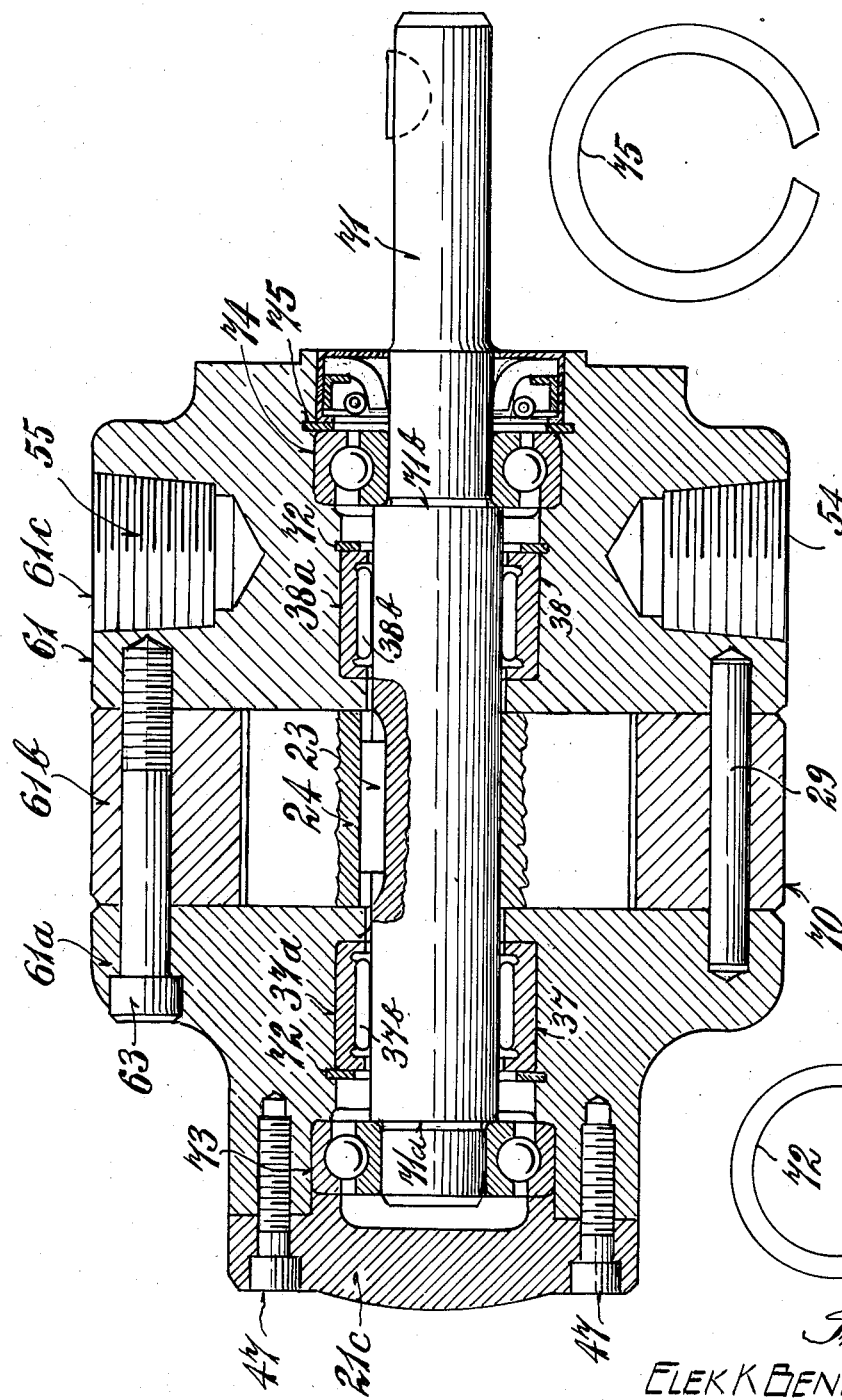

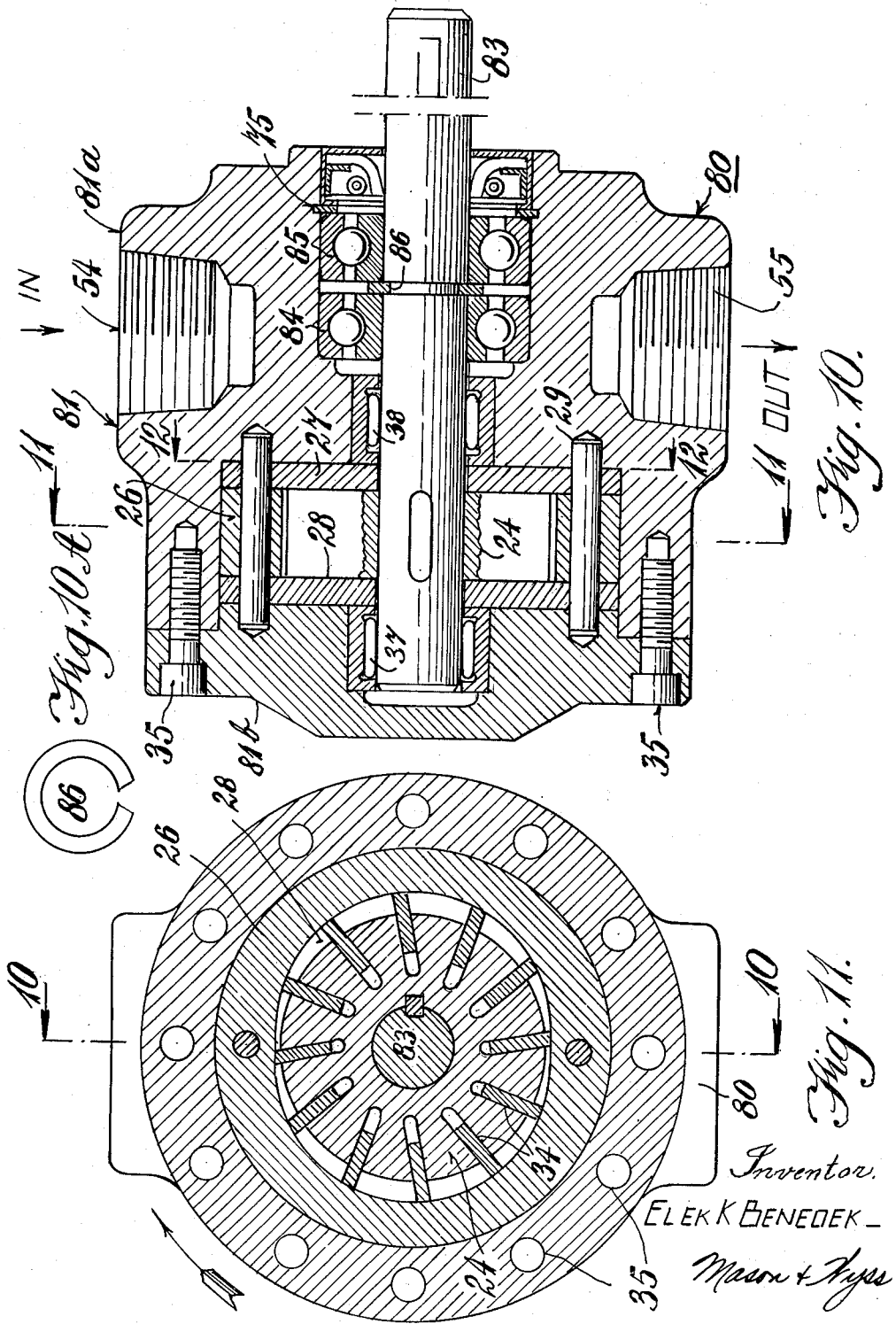

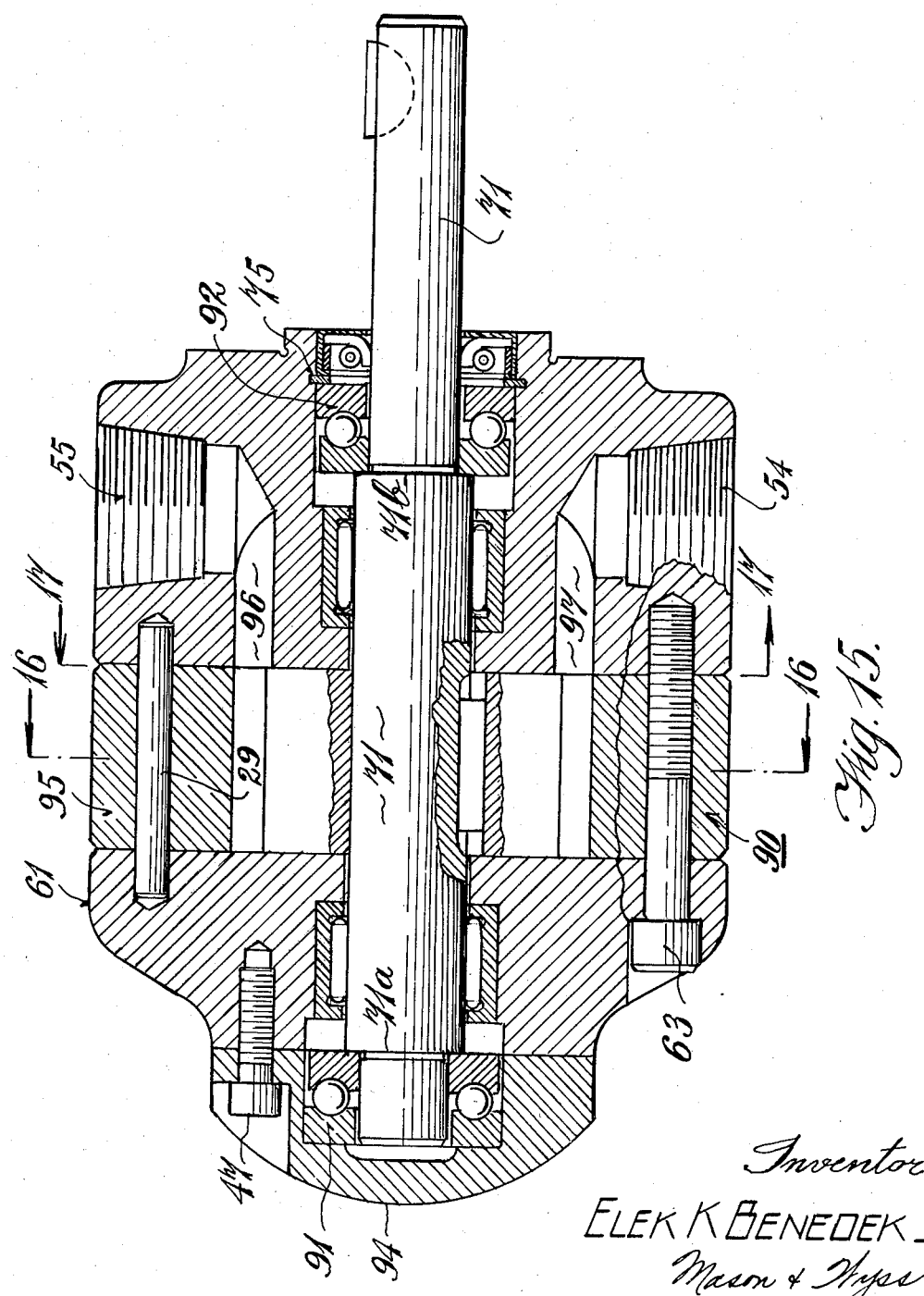

June 17, 1958     E. K. BENEDEK     2,839,007
ROTARY FLUID PRESSURE DEVICE
Filed April 16, 1952     9 Sheets-Sheet 9

Inventor.
ELEK K BENEDEK
Mason & Wyss
Attorneys

United States Patent Office 2,839,007
Patented June 17, 1958

2,839,007

ROTARY FLUID PRESSURE DEVICE

Elek K. Benedek, Chicago, Ill.; Melba L. Benedek, administratrix of said Elek K. Benedek, deceased, assignor to Melba L. Benedek Application April 16, 1952, Serial No. 282,529

1 Claim. (Cl. 103—135)

This invention relates to rotary fluid pressure devices and more particularly to pumps of the rotary vane type wherein a rotor is provided with a plurality of vanes arranged to move inwardly and outwardly thereof in a substantially radial direction during the operation of the device.

Fluid pressure devices of the type referred to above are extensively used in hydraulic applications where a fluid in the form of a liquid such as oil, for example, is employed. It will be understood, however, that certain features of the present invention are applicable fluid pressure devices for use with other types of fluids.

Fluid pressure devices of the type referred to above as heretofore constructed for use in the medium pressure range, such as 1000 to 1500 pounds per square inch have been found to wear out very rapidly under hydrostatic pressures within this range. It will be understood that the higher the rated working pressure of these pumps or fluid pressure devices the closer the working clearances must be maintained between the rotor slots and vanes on the one hand, and the shaft and shaft bearings on the other hand. Irrespective of such clearances or tolerances with reference to the working parts of the fluid pressure device, it has been found that during the stationary operation of such a pump, the hydrostatic pressure will penetrate on that side of the shaft and main bearing bore where the clearance is greatest while on the diametrically opposed side of the shaft all clearance is taken up with the result that the fluid is pressed out at one point so as to produce metal to metal contact between the shaft and bearing with the consequent wear of the shaft and bearing to produce eccentricities.

Such eccentric wear of the shaft and bearing will permit fluid under pressure to flow into the eccentric side or the clearance side and not on the opposite side of the shaft where it would be desired and useful with the result that a substantial load is superimposed on the effective and working load of the fluid pressure device. Furthermore, it will be understood that the ordinary rotary vane type fluid pressure device is an high speed device generally driven at the same speed as conventional electric motors which usually operate in the range of 1200 to 3600 R. P. M. In addition to high operating speeds these pumps have a heavy constant load, it being impossible to unload them during a part of the pressure cycle when only a small amount of the fluid is needed. Since they are of the constant volume type, they must operate at full stroke and full speed at all times during the operating cycle. Consequently such rotary vane type pumps as have been heretofore available have been found to wear out so rapidly during use in high pressure hydraulic applications as to make them unsatisfactory, and it would be very desirable to provide an arrangement whereby their useful life and efficiency may be greatly extended at the rated speed and pressures at which they are generally employed.

There is still a third factor which causes trouble in fluid pressure devices of the type named above, namely the fluid pressure which tends to flood the housing, and cause axial forces to be applied to the parts of the device which cannot always be balanced out by opposed pressure forces. It is apparent that such axial forces might tend to cause high friction between parts of the vanes and the sides of the fluid pressure chamber. Furthermore, such pumps are often coupled to driving means in a manner that some unbalanced load is applied to the pump shaft with the result that wear occurs between the pump parts themselves as well as between the shaft and the bearings. Such wear in the pump parts will cause additional unbalanced loads of an hydrostatic nature with further wear and inefficiency. It would be desirable therefore to provide a fluid pressure device of the type referred to above in which the undesirable features of pumps employed heretofore are completely eliminated.

Applicant discovered in an hydraulic device of this character that the parasitic slip forces in due time may become enormous and overshadow the expected load, and destroy the sealing quality of the pump very rapidly. The pressure fluid will spread around areas and into small sealing clearances, and build up such tremendous pressure loads that the sealing quality of the pump will be destroyed. To eliminate such destructive forces applicant invoked the help of heavy duty anti-friction bearings to secure radial and axial stability for the various pump parts which are subject to the parasitic fluid forces. Pump parts which are under hydrostatic balance naturally do not need such stabilizing support, but it is important in all cases to assure a balanced and permanent working clearance around unbalanceable parts.

It is an object of the present invention to provide a compact fluid pressure device of the type mentioned above which reduces to a minimum hydraulic and mechanical unbalance wear.

It is another object of the present invention to provide in a vane type rotary pump a new and improved vane and rotor structure which will permit better hydrostatic sealing and less friction.

Still another object of the present invention is to provide a new and improved fluid pressure device including separate radial and axial load bearing members for the impeller shaft.

A further object of the present invention is to provide a new and improved bearing arrangement for rotary vane type pumps whereby no uni-directional play may be developed by wear, and whereby uniform wear of the shaft and related bearing parts occurs without the possibility of unbalance due to hydrostatic pressure.

A more specific object of the present invention is to provide in a rotary fluid pressure device a pair of radial load bearings on either side of the rotor together with axial thrust bearings so as to fix the rotor shaft against axial load movement under all hydrostatic and driving load conditions.

A further object of the present invention is to so preload each set of the radial and axial anti-friction bearing assemblies to the amount of the rated load in such a manner that the total load is evenly distributed among all of the balls or rollers.

It is another object of the present invention to provide a new and improved construction of the pump parts of a fluid pressure device.

Still a further object of the present invention is to provide an improved rotary vane pump which is simple and compact, readily assembled, inexpensive in construction, and sturdy and foolproof in operation.

Further objects and advantages of the present invention will become apparent as the following description proceeds and the features of novelty which characterize the invention will be pointed out with particularity in the claim annexed to and forming a part of this application.

For a better understanding of the present invention reference may be made to the accompanying drawings in which:

Fig. 1 is a horizontal longitudinal sectional view of a fluid pressure device embodying the present invention;

Fig. 2 is a sectional view taken on line 2—2 of Fig. 1;

Fig. 2A is a view similar to Fig. 2 to aid in better understanding one feature of the present invention;

Fig. 3 is a sectional view taken on line 3—3 of Fig. 1 assuming that Fig. 1 shows a complete structure;

Figs. 3A, 3B, 3C and 3D are enlarged sectional views showing the details of modifications of the vane or blade structure shown in Fig. 3;

Figs. 3E and 3F are enlarged perspective views of a modified vane or blade structure;

Fig. 4 is a sectional view taken on line 4—4 of Fig. 1 showing the valve plate of the fluid pressure device assuming that Fig. 1 shows a complete structure;

Fig. 5 is an end view of the reactance ring of the device of Fig. 1 to illustrate the constructional details thereof and particularly the path of movement of the blade or vane tips where two suction and two delivery strokes per pump revolution are provided;

Fig. 5A is a view similar to that of Fig. 5, showing a modified path of movement of the blade or vane tips;

Figure 16:
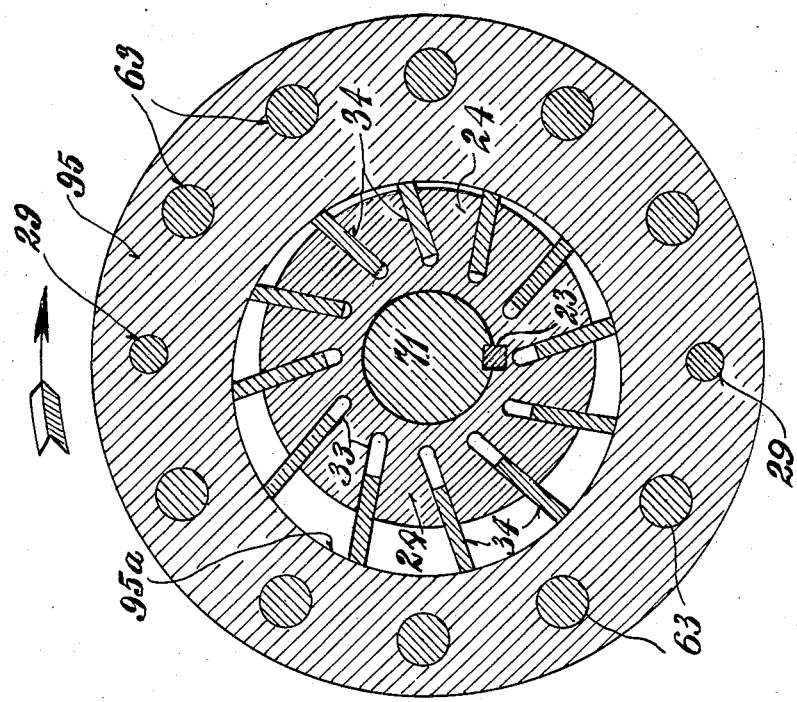
Figure 17:
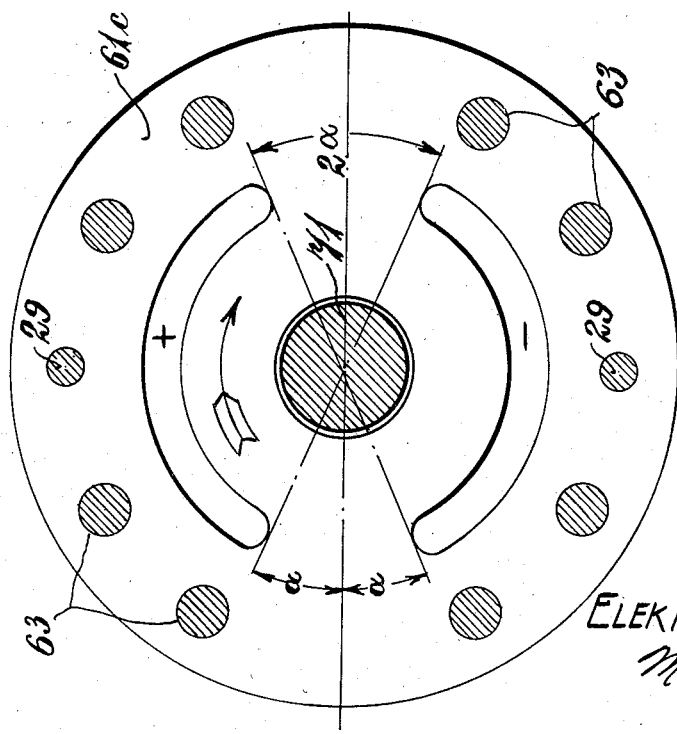

Fig. 6 is a sectional view taken on lines 6—6 of Figs. 1 and 7 assuming Figs. 1 and 7 show a complete structure;

Fig. 7 is a longitudinal sectional view similar to Fig. 1 of another embodiment of the present invention showing a sandwich type vane pump;

Fig. 8 is a sectional view taken on line 8—8 of Fig. 7 assuming Fig. 7 shows a complete structure;

Fig. 8A is an enlarged sectional detailed view of one of the vanes of Fig. 8;

Fig. 9 is a sectional view similar to Figs. 1 and 7 showing still another modification of the present invention;

Figs. 9A and 9B are plan views of snap rings 72 and 75, respectively, employed in connection with the arrangement shown in Fig. 9;

Fig. 10 is a sectional view similar to Figs. 1, 7 and 9 illustrating still another modification of the present invention and taken on line 10—10 of Fig. 11, assuming Fig. 11 shows a complete structure;

Fig. 10A is a plan view of snap ring 86, employed in connection with an arrangement in Fig. 10;

Fig. 11 is a sectional view taken on line 11—11 of Fig. 10 assuming Fig. 10 shows a complete structure;

Fig. 12 is a partial sectional view taken on line 12—12 of Fig. 10 showing the valve plate which is substantially identical with that shown in Fig. 4 except with the direction of pump rotation reversed;

Fig. 13 is a view partly in section of the shaft and bearing assembly of Fig. 10;

Fig. 14 is a sectional view taken on line 14—14 of Fig. 13;

Fig. 15 is a sectional view similar to that of Figs. 1, 7, 9 and the like, showing still another modification of the present invention;

Fig. 16 is a sectional view taken on line 16—16 of Fig. 15 assuming that Fig. 15 shows a complete structure; and Fig. 17 is a sectional view taken on line 17—17 of Fig. 15 assuming Fig. 15 shows a complete structure.

Referring now to Figs. 1 to 6 of the drawings, there is illustrated a double action vane type pump generally indicated at 20 comprising a housing generally designated at 21 including a plurality of parts such as a shaft housing proper 21a, a shaft end cover 21b and end caps 21c and 21d respectively. Mounted for rotation in the housing 21 in a manner to be described hereinafter is a rotatable impeller shaft or pump shaft generally designated at 22 to which is fastened for rotation therewith by any suitable means as for example the key 23, a rotor 24.

For the purpose of properly supporting the effective parts of the pump 20 which include among other things the rotor 24, the section 21a of the housing is provided with a recess or counter bore generally designated at 25 for receiving therein the rotor 24, a somewhat annular shaped reactance ring 26, and a pair of side plates 27 and 28 respectively. As illustrated in Fig. 1 of the drawings, the side plate 27 is first received in the counter bore 25 after which the somewhat annular reactance ring 26 and the rotor 24 are adapted to be received therein, the rotor 24 being keyed to the rotor or impeller shaft 22. Following this the side plate 28 is adapted to be inserted in the counter bore 25. With this arrangement it is apparent that the side plates 27 and 28, the reactance ring 26 and the rotor 24 are removably assembled.

For the purpose of holding these parts in proper position suitable means specifically illustrated as dowel pins 29 are provided which extend through cooperating openings in the reactance ring 26 and in the side plates 27 and 28 as well as cooperating recesses in the housing portions 21a and 21b respectively. The details of the side plate 27 which is also the valve plate is clearly shown in Fig. 4 of the drawings. As illustrated, the side plate 27 in addition to being provided with openings for receiving the dowel pins 29 and the shaft 22 is also provided with ports 30 arranged in diametrically opposed relationship relative to the shaft 22 which ports are suction ports for the direction of rotation indicated by the arrow of Fig. 3 of the drawings, and pressure or delivery ports 31 also arranged in diametrically opposed relationship relative to the shaft 22.

As illustrated, the ports in the valve plate 27 are all of identical elongated arcuate configuration and each port is separated from that of the adjacent port by a bridge portion which is illustrated in Fig. 4 of the drawings as subtending the angle 2. The spacing between adjacent ports bears a predetermined relationship to other elements of the structure which will be described in greater detail hereinafter. Furthermore, by having identical equally spaced ports and bridges the pump may be rotated in either direction, as will be brought out hereinafter, by merely reversing the suction and delivery ports. It will be understood that although two intake and two outlet ports 30 and 31 respectively are illustrated in the side plate 27, indicating that the pump 20 has two suction and two delivery strokes during each revolution thereof, the present invention is not limited to this type of construction for, as is illustrated in Figs. 15, 16 and 17, the pump might also be designed so as to provide a single suction and a single delivery stroke per revolution.

The reactance member 26 is best shown in Fig. 5 of the drawings. This reactance ring 26 has a circular outer diameter so as to be readily confined within the bore 25 of the housing portion 21a. However, the inner surface of the reactance ring has a configuration somewhat elliptical in form, best shown in Fig. 5 of the drawings. As illustrated, the reactance ring 26 comprises two integral identical portions 26a and 26b, the inner surfaces of which are circular each having the radius R with the centers of the circles represented at $O_1$ and $O_2$ respectively, disposed respectively on the spaced parallel vertical lines $e_1$ and $e_2$. These lines $e_1$ and $e_2$ are separated a predetermined distance so as to define the portions 26c of the rectance ring 26 therebetween. The inner surfaces of the portions 26c are straight lines, the ends of which are tangential to the adjoining portions of the inner circular surfaces of the portions 26a and 26b. It will be apparent therefore that the reactance ring 26 at its inner surface defines the path of travel for the vanes, to be described hereinafter, and with the arrangement described, provides smooth and shockless vane performance under both high pressure and high speed operation.

The reactance member 26' shown in Fig. 5A has the same circular outer diameter as the reactance member 26 of Fig. 5 of the drawings. The portions 26'a and 26'b are also substantially identical with the portions 26a and 26b each having an inner radius equal to R. However, the portions 26'c do not have an inner straight line portion but instead have a curved portion of a diameter $R_1$ which is greater than R and as indicated for the inner surface of the upper portion 26'c the radius R starts at point $O_3$. The diameters $e'_1$ and $e'_2$ separate the portions 26'a and 26'b from the portions 26'c. Also, at these junction points the circles have a radius R and the circles having a radius $R_1$ are merging into a continuous elliptical or eggshaped pathway.

As is best shown in Fig. 3 of the drawings, the rotor 24 comprises a cylindrical disk of substantial thickness keyed to the shaft 22 as described above. The rotor 24 is provided with a plurality of vane slots designated as 33 within which a plurality of vanes 34 are disposed, the particular construction of which is described in greater detail hereinafter. The vanes 34 are movable inwardly and outwardly relative to the slots 33 in a somewhat radial direction. The reactance ring 26 is in effect a vane track ring which surrounds the rotor and the inner surface of the reactance ring 26 described in detail above in connection with Fig. 5, forms a track adapted to contact the outer ends of the vanes 34, and to guide the vanes in their inward and outward movement. The inner surface of the reactance ring 26 is referred to hereinafter as the vane track. The width of the reactance ring or member 26 is such that when the pump parts are installed in the counter bore 25 the rotor 24 and its vanes or blades 34 are still free or in other words are slightly smaller in width than the reactance ring, thereby providing free rotation. This small clearance and its accurate control as hereinafter described, is very important from the standpoint of efficiency of operation of the pump 20. It will be understood that an high pressure film of oil is formed by capillary action along the side plates 27 and 28 to reduce slippage or leakage of the hydraulic fluid and friction and wear between the blades or vanes 34 and side plates 27 and 28.

In order to compensate for wear of the plates 27 and 28 and the blades 34, the plates 27 and 28 are removably mounted as described above and the portion 21b of the housing 21 is provided with a portion of reduced cross-section insertable within the bore 25 as is clearly shown in Fig. 1 of the drawings. The portion 21b of the housing 21 is furthermore adapted to be fastened to the portion 21 in an adjustable manner with respect to the space defined therein for the pump parts by suitable fastening means such as the stud bolts or cap screws 35.

For the purpose of rotatably supporting the rotor shaft 22 in the housing 20 with respect to the radial thrust load there are provided a pair of anti-friction bearings generally designated at 37 and 38 in Fig. 1 of the drawings and specifically illustrated as roller bearings. As illustrated, the needle type roller bearings are disposed in suitable outer races specifically designated as 37a and 38a with reference to the needle bearings 37 and 38. To simplify the construction no inner bearing races are associated with the rotor shaft 22, and instead the surfaces of the shaft 22 adjacent to rollers 37b and 38b of the bearings 37 and 38 respectively are hardened to serve effectively as the inner races for the rollers 37b and 38b. It should be understood that if desired the outer races might also be dispensed with, and the recesses in the housing portions could function as outer races. Since the outer race 38a is mounted in a suitable recess refined in the housing portion 21a and the outer race 37a is mounted in a suitable recess defined in the housing portion 21b, it is essential that the housing portions 21a and 21b are associated with each other in a concentric manner to insure concentricity of the anti-friction bearings 37 and 38. This is insured in accordance with the present invention by virtue of the fact that the portion of reduced cross-section of the housing portion 21b is disposed within the counter bore 25. The anti-friction bearings 37 and 38 which support the radial thrust of the fluid pressure device are designed to permit limited axial movement of the shaft 22, while bearings 41 and 42 are being provided to lock the shaft 22 against axial movement to these bearings and the housing 20 by means of axially adjustable nuts 44 and 45 respectively.

In accordance with the present invention the anti-friction roller bearings 37 and 38 are assembled with zero radial clearance including the preload and with zero eccentricity. This is illustrated best in Fig. 2 of the drawings where the radial clearance is represented by Y O, and the eccentricity of the shaft 22 is represented by X O. This arrangement provides an interesting contrast with Fig. 2A of the drawings where there is shown a shaft generally designated at 22' mounted within a bearing represented by the reference numeral 39 where a substantial clearance Y is designated together with a substantial eccentricity X. It will be apparent that the fluid in the arrangement disclosed in Fig. 2A will tend to move into the clearance space Y and move out of the space diametrically opposite thereto so as to cause a definite wear, and increase the eccentricity X thereof. Similarly, the clearance space permits the escape of fluid so as to superimpose a leakage load on top of the pump load. In the arrangement disclosed in Fig. 2 of the drawings, the fluid is permitted to surround the shaft with balanced pressure thereby reducing wear to a minimum and substantially completely eliminating eccentricity and unbalance.

The amount of preload will be equal to the average working load of the pump prorationed per bearing. The simplest method to preload the radial shaft bearings is to design the shaft, the housing bore and the bearing assemblies with the necessary interference fit radially and then press-fit or slip-fit them during assembly into proper position. Either the shaft or the housing bore can be modified by heating or cooling and thus by increasing or decreasing the respective diameters for ease of assembly. Thus when a preload substantially equal to the load is imposed on the bearing structures in assembly, the active load during pump operation will not and cannot change the concentricity of the shaft, with regard to the bearings themselves, and furthermore, all of the needles 37b and 38b will be subject to the load, irrespective of the direction of the bearing load. In this manner the maximum load per needle will be very little, and the wear will be negligible. A long and extended useful life and operation of the pump will be provided.

In accordance with the present invention, anti-friction bearing means are also provided to eliminate any axial displacement of the pump parts with consequent wear. To this end there are illustrated generally in Fig. 1 of the drawings, anti-friction bearings designated at 41 and 42 respectively. These bearings are illustrated as tapered roller bearings mounted in an indirect manner although it will be understood that other thrust bearings such as are illustrated in other figures of the drawings might equally well be employed. As illustrated, the anti-friction thrust bearing 41 comprises an outer race 41a mounted in the housing portion 21b and an inner race 41b associated with the shaft 22. A plurality of tapered rollers 41c are disposed between the inner and outer races. Similarly the anti-thrust bearing 42 comprises an outer race 42a and an inner race 42b for accommodating the tapered rollers 42c. For adjusting the bearings 41 and 42 the shaft 22 is provided with threaded portions 22a and 22b respectively for accommodating nuts 44 and 45 respectively. These nuts 44 and 45 are so adjusted that axial movement of the shaft 22 is substantially eliminated. Preferably this adjustment is made by tightening the nuts 44 and 45 until the bearings just lock the shaft 22 against rotation. Then the nuts are turned back to give the desired clearance. Preferably the anti-friction bearings 41 and 42 are adjusted to give the same zero radial clearance and the same preload that the needle roller bearings 37 and 38 provide. With this arrangement there is added to the radial thrust capacity of the anti-friction bearings 37 and 38 all of the radial capacity of the tapered roller bearings 41 and 42, thus insuring a very rigid and compact support for the shaft 22 of the pump 20.

It will be understood that the enlarged ends of the tapered rollers 41c and 42c could equally well be mounted so as to be adjacent the rotor 24 in what might be termed a direct mounting arrangement. Under these conditions the heavy ends or enlarged ends of the tapered roller 41c and 42c would be mounted against appropriate shaft shoulders thus requiring heavier shaft portions adjacent thereto.

The end plates 21c and 21d referred to above may be suitably fastened to the adjacent housing portions 21b and 21a respectively by any suitable fastening means such as stud bolts or cap screws 47.

As was described above, the vane track of the reactance ring 26 provides a contour made up of pure circular sections interconnected by short straight line sections tangential thereto thereby providing a continuous track to cause pure harmonic, radial and tangential motion of the blades 34. Preferably the radius R of the vane track portions shown in Fig. 5 of the drawings is substantially the same as the radius of the rotor 24. Thus very gradual and smooth movement of the vanes results with the elimination of the abrupt movement of prior art arrangements and the resultant radial and tangential acceleration with the consequent rapid wear of the vanes and reactance ring.

Instead of employing a single unitary vane as in prior art constructions there is illustrated in accordance with the present invention a preferred vane construction wherein each vane or blade 34 comprises two relatively movable blade parts designated at 34a and 34b in Fig. 3A of the drawings. However, the reference numeral 34 is used throughout this specification to designate the rotor blade or vane regardless of whether it is a single or multiple part member.

As is best shown in Fig. 3A of the drawings, this dual vane construction provides a two-line contact seal between each double blade and the vane track. Furthermore, it is apparent from an examination of Fig. 3A of the drawings that there is provided a triangularly shaped chamber 48 within which a wedge-shaped film of oil is entrapped between the blades 34a and 34b which provides an improved seal against leakage during both the suction and pressure strokes of the pump, thus insuring less suction leakage as well as less leakage between a pressure cell and a suction cell.

Figs. 3B and 3C show arrangements very similar to Fig. 3A in which the double blade ends are of right angled configuration instead of triangular as in Fig. 3A. Figs. 3B and 3C furthermore show the disposition of the blade portions 34'a and 34'b when the blades are positioned in a flat section of the vane track and a steep section of the vane track respectively.

Instead of the ends of the double blades or vanes being rectangular in construction or of triangular configuration as mentioned above, they may be rounded as shown in the somewhat enlarged sectional view of Fig. 3D. The double plates 34"a and 34"b are indicated as making line contact with the vane track of the ring 26 so as to trap a substantial amount of fluid in the space 49. By using the rounded ends as shown in Fig. 3D for the vanes the scraping or frictional action with the vane track is somewhat reduced.

Ordinarily the spaces such as 48 and 49 between the blades adjacent the vane track are filled with fluid by capillary action and provide sustained lubrication for the blades during the operation of the pump. It will be understood that this method of lubrication of the blade ends is very effective since both the centrifugal force as well as the capillary force keeps such spaces filled with fluid under pressure as rapidly as necessary under all operating conditions.

The double blade construction described above preferably comprises two thin blades having a total over-all thickness no greater than that of the single blades used heretofore. This construction provides a somewhat stronger blade which is more flexible mechanically. They are also easy to manufacture and are preferably formed from cold rolled precision sheet metal stock and are tempered to the characteristic of spring steel. Preferably, as is best shown in Fig. 3 of the drawings, the blades or vanes 34 are tipped forward by a small angle of 10° or 15° in the direction of rotation which is designated by the arrow in Fig. 3 of the drawings thereby stabilizing blade tip friction against the variable curvature of the vane track. It should be understood that since the pump 20 is reversible, the direction of rotation indicated by the arrow of Fig. 3 of the drawings could just as well be reversed so that the blades or vanes 34 are tipped backward rather than forward.

It should be understood that although the double vane structure is believed to be more desirable, the present invention is equally applicable for use with a single vane structure as is apparent from figures such as 8, 11 and 16 of the drawings. In Fig. 3E there is illustrated in enlarged perspective view a vane or blade 50 which has the end engaging the reactance ring 26 chamfered on both sides as indicated at 51. If desired this chamfered construction may be provided on only one side of the blade. In Fig. 3F there is illustrated a blade 52 having a triangular tip provided with end surfaces 53.

For the purpose of providing a fluid path to and from the rotor chamber the housing portion 21a is provided with what may be designated as a fluid inlet opening 54 and fluid outlet opening 55 suitably threaded to permit fluid connections to be readily made thereto. The fluid inlet connection 54 is connected by suitable passageways 56 and 57 defined in the housing portion 21a with the suction ports 30 in the side or valve plate 27, best shown in Fig. 6 of the drawings. Similarly the outlet 55 defined in the housing portion 21a is connected by suitable passageways 58 and 59 preferably integrally cased in the housing portion 21a with the delivery or pressure ports 31.

It will be understood, as we mentioned above, that by virtue of the symmetrical arrangement of the suction and delivery ports 30 and 31 and the connections to the inlet and outlet openings 54 and 55, and the rotor 24 of the fluid pressure device 20 of the present invention may be rotated in either direction so that it is effectively a reversible device. Consequently, although the ports 30 and passageways 56 and 57 have been designated as inlet or suction ports and passageways, and the ports 31 and passageways 58 and 59 as outlet or delivery ports and passageways, it will be understood that these are by way of explanation only and depending upon whether clockwise or counter-clockwise rotation of the pump is desired, the proper flow of fluid through the passageways will occur.

An examination of the radial load and axial load bearings described above indicates that the radial load bearings are placed as close to the rotor and pump assembly as possible, one on each side thereof while the axial or thrust shaft bearings are farther away from the rotor thereby giving maximum stability to the shaft.

Before describing the operation of the pump described thus far, a description of the modification shown in Figs. 7 and 8 is included herewith since the construction is substantially identical with that described except that a different type of pump is employed. Accordingly, the corresponding parts of Figs. 7 and 8 are designated by the same reference numerals as in the preceding figures.

As illustrated in Fig. 7 the fluid pressure device generally designgated at 60 is what may be generally defined as a sandwich type pump in which the pump housing 61 essentially comprises three parts, 61a, 61b and 61c. The portion 61b is sandwiched between the portion 61a and 61c, and hence the name sandwich pump. Actually the portion 61b is the reactance ring of the preceding disclosure which provides two ground end surfaces adapted to mate closely with ground surfaces on the adjacent surfaces of the housing portions 61a and 61c respectively. The portion 61b defines the vane track which is identical with the vane track of the member 26.

For the purpose of holding the housing portions 61a, 61b and 61c together, there are provided the same dowel pins 29 for properly positioning the parts and a plurality of cap screws 63 circumferentially arranged as clearly indicated in Fig. 8 to maintain the parts in closely assembled relationship.

Except for the fact that the arrangement disclosed in Figs. 7 and 8 does not employ side plates such as 27 and 28, the other details thereof are identical with those described above including the needle bearings on either side of the pump unit closely adjacent thereto and the tapered roller bearings at either end of the shaft to prevent any axial movement. The vanes or blades 34 have been indicated as of the single blade construction and may have the configuration of Figs. 3E or 3F if desired. By virtue of the elimination of the valve plate or end plate 27, the suction and delivery ports 30 and 31 are defined in the housing portion 61. This construction requires the housing portion 61 to be made of a high grade metal to withstand the pumping action whereas in Figs. 1 to 6 inclusive the side plates 27 and 28 can be made of a high grade alloy and the remainder of the housing may be formed of a cheaper material.

In Fig. 8A there is illustrated in detail one of the vanes 34 which is displaced from the vertical as illustrated by an angle $\alpha$ and the tip thereof is beveled with reference to the horizontal by an amount also equal to the angle $\alpha$.

Assuming a counter-clockwise direction of rotation as shown in Figs. 3 and 8 of the drawings, it will be observed that the vanes 34 disposed in the lower left hand quadrant of the rotor are forced radially inward thereby decreasing the volume of the intervening cells in this quadrant which means a compression cycle during this quadrant. Consequently the port associated with this quadrant, i. e., port 31, is a pressure port and is so marked with the positive or plus sign in Figs. 4 and 6 of the drawings. In the next quadrant or the lower right hand quadrant of the pump structure the vane cells begin to increase their respective volumes and thus need more fluid so that they will suck fluid from a suitable source so that the port adjacent thereto designated by the numeral 30 is a suction port and is marked accordingly with the negative sign. The space between the ports such as 30 and 31, as was mentioned above, is referred to as a bridge and preferably the angular dimension of the bridge is $2\alpha$ as is clearly shown in Fig. 4 of the drawings. The length of each cell, or in other words, the angular space between two adjacent vanes 34 must be slightly less than $2\alpha$, the length of the bridge. In one embodiment of the present invention it was found desirable for the angular bridge length to be about 30°. If this dimension is employed it will be apparent that for the pumps described in Figs. 1 to 8 inclusive having two suction and two pressure strokes per revolution that the ports 30 and 31 will each subtend an angle of 60°. As the vanes move into the upper two quadrants of the pump structure shown in Figs. 3 and 8 of the drawings the process is repeated first with a pressure stroke and then with a suction stroke so that the pressure ports and suction ports are diametrically opposed from each other. Theoretically therefore the hydrostatic load on the shaft 22 is zero. As a practical matter this condition is never reached, but by employing the improved and precision multi-purpose bearings of the present invention the ideal condition is substantially realized since in any event shaft wear and main bearing wear is greatly reduced and pump efficienecy is increased substantially.

Referring now to Figs. 9, 9A and 9B of the drawings, there is illustrated a pump 70 which is very similar in construction to the sandwich type pump shown in Fig. 7 of the drawings with the corresponding parts thereof designated by the same reference numerals. The needle bearings 37 and 38 are identical with those employed in Figs. 1 and 7 described above. For the purpose of mounting the shaft 71 of the pump 70 in the housing structure 61 there are provided a pair of snap rings 72 shown in enlarged form in Fig. 9A which are adapted to be inserted into suitable recesses defined in housing portions 61a and 61c, so as to hold the outer races 37a and 38a in proper position in the housing, and yet permitting ready disassembly of the pump when desired. For the purpose of eliminating axial thrust two sets of anti-friction bearings specifically designated as roller bearings 73 and 74 are provided. A suitable shoulder 71a adjacent one end of the shaft 71 bears against the inner race of the ball bearing 73 the outer race of which is suitably held in the housing 61 by means of the configuration of the housing portion 61a and the end cap 21c. Similarly the ball bearing 74 has the inner race thereof in engagement with the shoulder 71b formed at the other end of the shaft 71. For the purpose of eliminating axial movement and yet permitting disassembly of the pump structure the anti-friction thrust bearing 74 is held in place by a snap ring 75, shown in plan view in Fig. 9B, which snap ring is adapted to be inserted into a recess defined in the housing portion 61c. It will be apparent therefore that as in the preceding construction pre-loaded anti-thrust bearings are provided with the needle bearings 37 and 38 permitting slight axial movement of the shaft during adjustment of the ball bearings. As in the preceding constructions, the shaft 71 is provided with means such as an extension whereby the shaft may be keyed to a pulley, coupling, or other suitable means.

Referring now to the embodiment of the present invention illustrated in Figs. 10 to 14 inclusive, where the corresponding parts are again designated by the same reference numerals as the preceding figures, there is illustrated a fluid pressure device generally designated at 80. This device or pump comprises a housing portion 81b formed of two housing portions 81a and 81b respectively, the housing portion 81b also serving the function of the end cap 21c disclosed in prior embodiments. The pump structure including the reactance ring 26 and the rotor 24 and the vanes 34 together with the side plates 27 and 28 are preferably identical with the arrangement disclosed in Fig. 1 with the housing portion 81a including a recess or counter bore similar to the counter bore 25 described above and the housing portion 81b including the extension of reduced cross-section adapted to fit into this counter bore.

As illustrated in Fig. 10, anti-friction bearings 37 and 38 are provided on either side of the rotor 24 to support the radial load, the outer races of which are pressed into the housing portions 81b and 81a respectively and a shaft 83, corresponding to the shaft 22, being provided with hardened surfaces for engaging rollers 37b and 38b respectively. The roller or needle bearings 37 and 38 effectively form with the housing 81 a subassembly and in accordance with the present invention the shaft 83 and the shaft bearings 84 and 85 form a second subassembly which subassembly is best shown in Fig. 12 of the drawings. As illustrated, the bearings 84 and 85 are roller bearings substantially identical with the roller bearings 73 and 74 shown in Fig. 9 of the drawings. However, the roller bearings 84 and 85 are shown closely adjacent to each other separated only by a suitable shoulder which may be an integral portion of the shaft 83 or a snap ring 86 shown in plan view of Fig. 10A of the drawings and adapted to snap into a recess or groove 83a defined in the shaft 83. It will be apparent that the roller bearings 84 and 85 disposed in a suitable recess defined in the housing portion 81 will prevent any axial movement of the shaft 83 due to engagement with the shoulder or snap ring 86. The bearings 84 and 85 are held in assembled relationship in the housing subassembly by the snap ring 75 identical with that disclosed in Fig. 9 of the drawings and disposed in a circumferential groove defined in the housing portion 81. This construction permits the pump to be handled by grasping the shaft 83 without damaging the shaft seat or other internal parts of the pump. Furthermore, with the shaft subassembly shown in Fig. 13 of the drawings it is apparent that it may readily be inserted or removed from the housing 81 merely by removing the snap ring 75. Also, without disturbing the coupling and pump mounting, the entire pump assembly can be taken out by removing the housing portion 81b for inspection and reassembly. The needle roller bearing 37 may be pulled off with the housing portion 81b, since the snap ring or shoulder 86 and the pair of bearings 84 and 85 will withstand such pull without damage to the shaft seal or any other internal part of the pump.

It will be understood that the shaft bearing assembly comprising the ball bearings 84 and 85 may be replaced by equivalent bearings such as indirectly mounted tapered roller bearings as shown in Fig. 1 of the drawings without departing from the invention. The bearings press-fitted by their inner race to the shaft, will remain as part of the shaft sub-assembly, while the outer races are dimensioned to slip fit into the housing portion, such as 81a, by a standard slip fit for easy axial assembly and disassembly. It will be noted that the shaft 83 in Fig. 8 of the drawings requires no machining such as is the case with the shafts of Figs. 1, 7 and 9 of the drawings. Consequently, it can be selected from appropriate bar stock without machining at all, subject only to centerless finish grinding or lapping at a very minimum cost. Where tapered roller bearings are employed the shaft may require two sections of different diameters.

As was brought out above, for four ports in side plates such as 27, four bridges are necessary. The angular length of each bridge must be such that no call of the pump is short circuited on account of too short a bridge. Actually, to provide positive resistance to short circuiting the bridges are slightly longer than the circumferential lengths of the cells and the excess length of the bridges over the circumferential lengths of the cells is generally referred to as "positive lap." Since the direction of rotation in Fig. 11 of the drawings is shown reversed with respect to Figs. 3 and 8 of the drawings, the inlet and outlet are reversed as are also the suction and pressure ports. Otherwise, however, the operation is identical with that previously described.

Although the present invention has been described thus far in connection with fluid pressure devices of the balanced hydrostatic pressure type, the invention is equally applicable to arrangements in which only a single pressure and a single suction stroke are provided per revolution. Accordingly, in Figs. 15, 16 and 17 there is illustrated a pump generally designated at 90 which is of the sandwich type substantially similar to that shown in Fig. 9 of the drawings and the corresponding parts thereof are designated by the same reference numerals. The shaft 71 is provided with the shoulders 71a and 71b which engage thrust bearings 91 and 92 respectively. These thrust bearings differ from the bearings 73 and 74 in that the races of each bearing are displaced from each other along a longitudinal axis, while in the bearings 73 and 74 the inner and outer races are displaced from each other along a vertical axis. In other words, thrust bearings 91 and 92 are pure thrust bearings. The snap ring 75 identical with that shown in Fig. 9 of the drawings, holds the arrangement in assembled relationship and the thrust of the bearings 91 and 92 may be adjusted or preloaded by adjusting the end cap 94, which is fastened to the housing portion 61a by suitable cap screws 47. The major difference between the pump 90 and the pump 70 becomes apparent from an examination of Fig. 15, Figs. 16 and 17, where it may be noted that the sandwich portion of the housing designated by the reference numeral 95 contains a substantially different vane track designated by the reference numeral 95a since only a single suction and pressure stroke are produced during each revolution of the rotor 24. In addition, the delivery port 55 is now connected by a single passageway 96 which terminates in a pressure port 99. Also, the inlet port 54 is connected by a single passageway 97 to a suction port 98. The delivery and suction ports 99 and 98 respectively, are separated by the two bridges each subtending an angle of $2\alpha$. If the angle subtended by each bridge is 30° then the ports 98 and 99 each subtend an angle of 150°. It will be apparent in the arrangement shown in Figs. 15 to 17 inclusive, that an unbalanced hydrostatic pressure occurs and consequently the bearings 37 and 38 are very essential to counteract and carry the heavy unbalanced load and to prevent the wear which always occurs in an arrangement such as shown in Fig. 2A of the drawings, thus avoiding extreme eccentricities encountered in prior art arrangements.

It will be apparent that in any of the structures described above the multiple blade or vanes described may be employed if desired since the double blade cell will be twice as effective against fluid slippage and consequently improves the efficiency.

In view of the detailed discussion included above, the operation of the various arrangements disclosed which are substantially similar will be apparent to those skilled in the art and no further discussion thereof is included herein.

While there has been shown and described certain and particular embodiments of the present invention, it will be obvious to those skilled in the art that various changes and modifications may be made without departing from the invention in its broader aspects; and it is, therefore, aimed in the appended claim to cover all such changes and modifications as fall within the true spirit and scope of the present invention.

I claim:

A rotary fluid pressure device comprising a housing, a chamber in said housing, a rotor shaft extending through said chamber and mounted for rotation, a vaned pump rotor mounted on said shaft for rotation with said shaft, said rotor having fluid pumping means carried thereby for cooperation with said housing to provide pumping pressures within at least a portion of said chamber, said rotor having limited small axial clearance relative to the chamber in said housing, and means freely adjustably mounting said shaft relative to said housing to permit endwise axial adjustment of the position of said shaft relative to said housing and to provide axial slack take-up between said shaft and said housing, said means comprising a straight cylindrical needle roller bearing carried by said housing on each side of said chamber and rotatably carrying said shaft relative to said chamber, and oposed axial thrust bearing members each having one race member thereof secured in said housing against axial movement toward said chamber and the other race member slidably mounted on said shaft for axial adjustment therealong by an adjusting nut, said shaft and said housing and said bearings being free of cooperating abutment shoulders except at the two adjusting nuts at their sides facing toward said chamber and in cooperation with the said other race of the respective axial thrust bearing whereby said shaft may be axially freely adjusted relative to said housing by said adjusting nuts without other restriction against axial movement.

References Cited in the file of this patent

UNITED STATES PATENTS

| | | |
|---|---|---|
| 1,716,901 | Rochford | Jan. 11, 1929 |
| 1,965,388 | Ott | July 3, 1934 |
| 1,988,213 | Ott | Jan. 15, 1935 |
| 1,994,786 | Redfield | Mar. 19, 1935 |
| 2,068,918 | Kagi | Jan. 26, 1937 |
| 2,111,568 | Lysholm et al. | Mar. 22, 1938 |
| 2,126,247 | Eppers | Aug. 9, 1938 |
| 2,381,695 | Sennet | Aug. 7, 1945 |
| 2,476,397 | Bary | July 19, 1949 |
| 2,487,449 | Knudson | Nov. 8, 1949 |
| 2,492,868 | Johnson | Dec. 27, 1949 |
| 2,540,767 | Tabbert | Feb. 6, 1951 |
| 2,623,471 | Hartmann | Dec. 30, 1952 |
| 2,641,405 | Le Valley | June 9, 1953 |

FOREIGN PATENTS

| | | |
|---|---|---|
| 324,752 | Great Britain | Feb. 6, 1930 |
| 541,601 | Great Britain | Dec. 3, 1941 |